(12) United States Patent
Fuehra et al.

(10) Patent No.: US 12,415,231 B2
(45) Date of Patent: Sep. 16, 2025

(54) METHOD FOR JOINING AT LEAST TWO PARTS TO BE JOINED

(71) Applicant: TRUMPF Laser GmbH, Schramberg (DE)

(72) Inventors: Benjamin Fuehra, Schramberg (DE); Sebastian Hecker, Salem (DE)

(73) Assignee: TRUMPF LASER GMBH, Schramberg (DE)

( * ) Notice: Subject to any disclaimer, the term of this patent is extended or adjusted under 35 U.S.C. 154(b) by 58 days.

(21) Appl. No.: 18/415,909

(22) Filed: Jan. 18, 2024

(65) Prior Publication Data
US 2024/0149375 A1     May 9, 2024

Related U.S. Application Data

(63) Continuation of application No. PCT/EP2022/069983, filed on Jul. 18, 2022.

(30) Foreign Application Priority Data

Jul. 19, 2021 (DE) ...................... 10 2021 118 593.9

(51) Int. Cl.
*B23K 26/0622* (2014.01)
*B23K 26/244* (2014.01)
(Continued)

(52) U.S. Cl.
CPC ........ *B23K 26/0624* (2015.10); *B23K 26/244* (2015.10); *B23K 26/32* (2013.01); *B23K 26/57* (2015.10); *B23K 2103/18* (2018.08); *B23K 2103/42* (2018.08); *B23K 2103/52* (2018.08); *B23K 2103/54* (2018.08); *B23K 2103/56* (2018.08)

(58) Field of Classification Search
CPC .. B23K 26/0624; B23K 26/244; B23K 26/57; B23K 26/32; B23K 2103/18; B23K 2103/42; B23K 2103/52; B23K 2103/56; B23K 2103/54
See application file for complete search history.

(56) References Cited

U.S. PATENT DOCUMENTS

2002/0056707 A1   5/2002   Pinho et al.
2014/0216648 A1   8/2014   Geiger et al.
(Continued)

FOREIGN PATENT DOCUMENTS

DE          3621030 A1    1/1988
DE    102011081554 A1    2/2013
(Continued)

*Primary Examiner* — Edward F Landrum
*Assistant Examiner* — Theodore J Evangelista
(74) *Attorney, Agent, or Firm* — LEYDIG, VOIT & MAYER, LTD.

(57) ABSTRACT

A method for joining at least two parts by using ultrashort laser pulses of a laser beam of an ultrashort pulse laser is provided. At least one of the two parts to be joined is transparent for a wavelength of the ultrashort laser pulses. The method includes joining the at least two parts by using the ultrashort laser pulses of the laser beam along a joining seam. The joining seam has at least two joining points and a joining gap lying between the at least two joining points. Each joining point is longer than 10 μm.

20 Claims, 5 Drawing Sheets

(51) Int. Cl.
*B23K 26/32* (2014.01)
*B23K 26/57* (2014.01)
*B23K 103/00* (2006.01)
*B23K 103/18* (2006.01)

(56) References Cited

U.S. PATENT DOCUMENTS

| | | | | |
|---|---|---|---|---|
| 2015/0298255 A1* | 10/2015 | Hisada | ................... | B23K 26/32 |
| | | | | 219/121.64 |
| 2015/0314392 A1* | 11/2015 | Haschke | ................ | B23K 26/04 |
| | | | | 219/121.64 |
| 2019/0375046 A1* | 12/2019 | Grimm | ................ | B23K 26/22 |
| 2021/0008664 A1* | 1/2021 | Kumkar | ................ | B23K 26/50 |
| 2021/0276128 A1 | 9/2021 | Bauer et al. | | |
| 2021/0278603 A1* | 9/2021 | Fuchs | ................... | B23K 26/26 |
| 2024/0149375 A1 | 5/2024 | Fuehra et al. | | |

FOREIGN PATENT DOCUMENTS

| | | | | | |
|---|---|---|---|---|---|
| DE | 102014203845 | A1 | | 9/2015 | |
| DE | 102017205765 | A1 | | 10/2018 | |
| DE | 102018205325 | A1 | | 10/2019 | |
| DE | 102018120011 | A1 | | 2/2020 | |
| DE | 102018220447 | A1 | * | 5/2020 | ......... B23K 26/0624 |
| DE | 102020123540 | A1 | * | 3/2022 | ......... B23K 26/0624 |
| DE | 102021118593 | A1 | | 1/2023 | |
| JP | 2004306057 | A | | 11/2004 | |
| JP | 2009056483 | A | * | 3/2009 | |
| WO | 2020254639 | A1 | | 12/2020 | |

\* cited by examiner

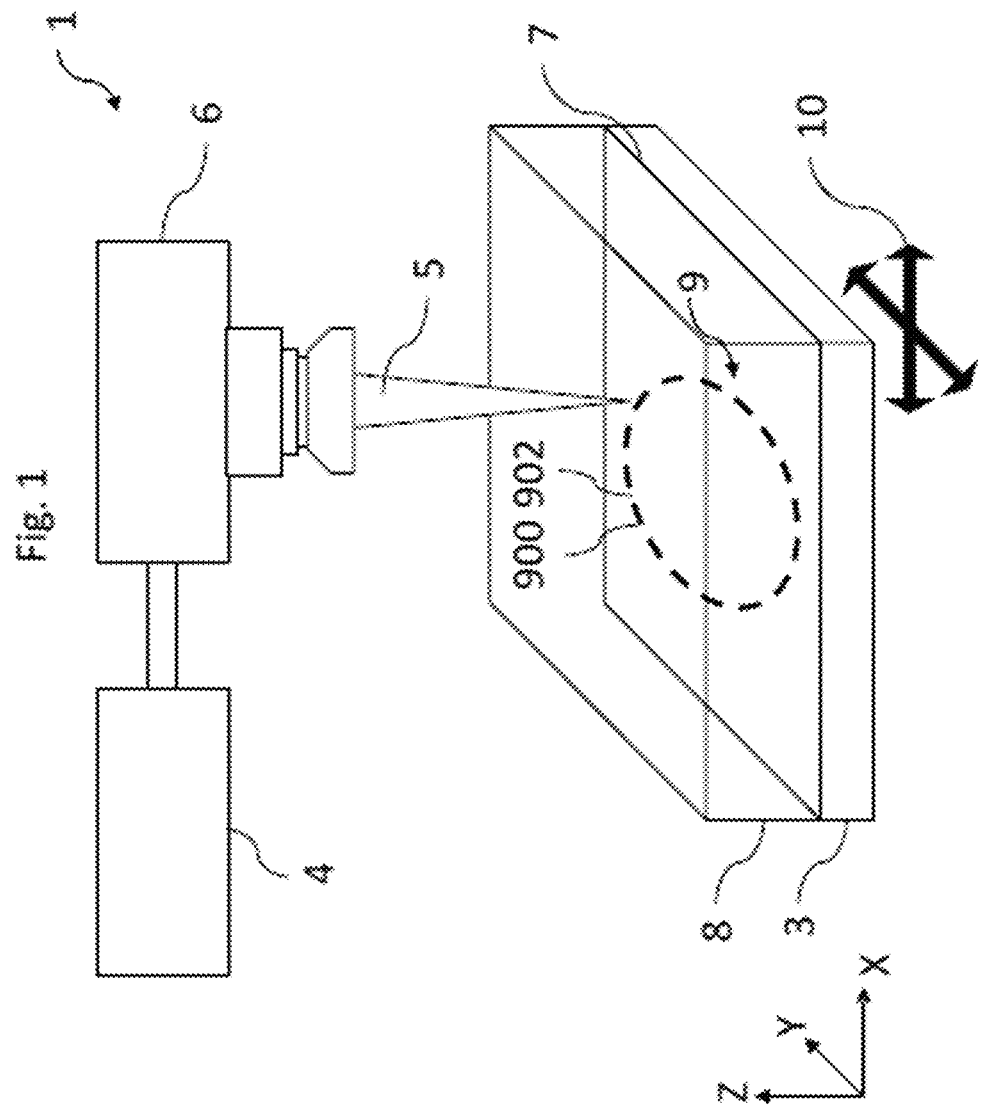

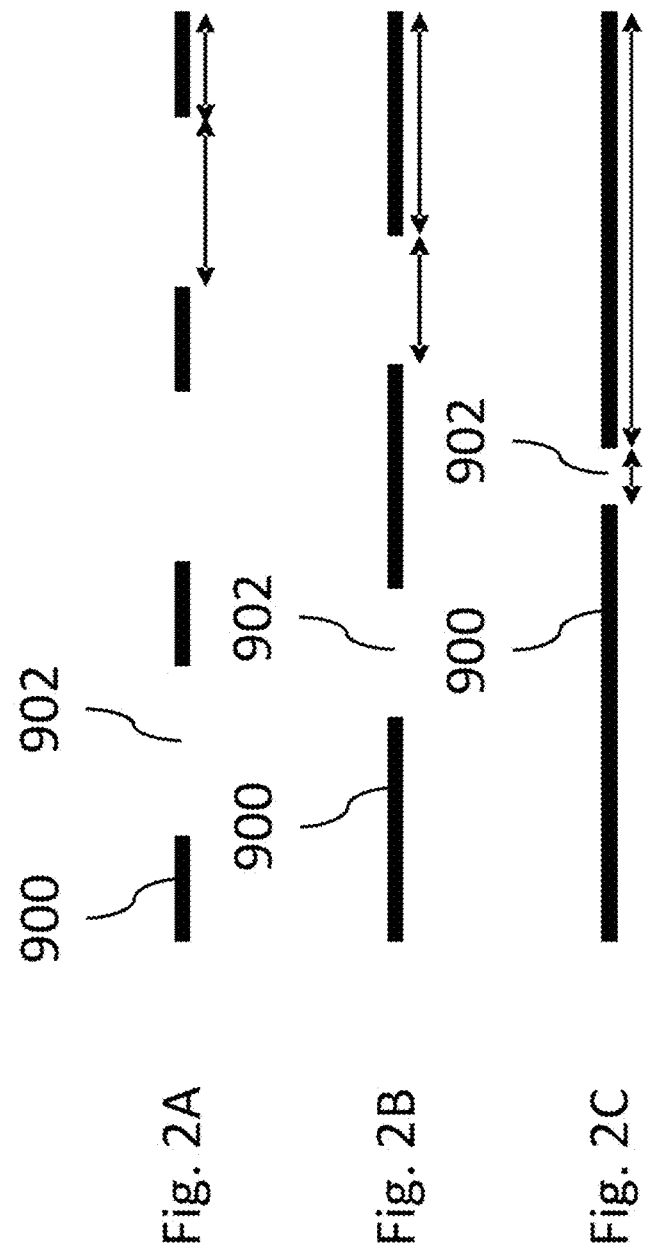

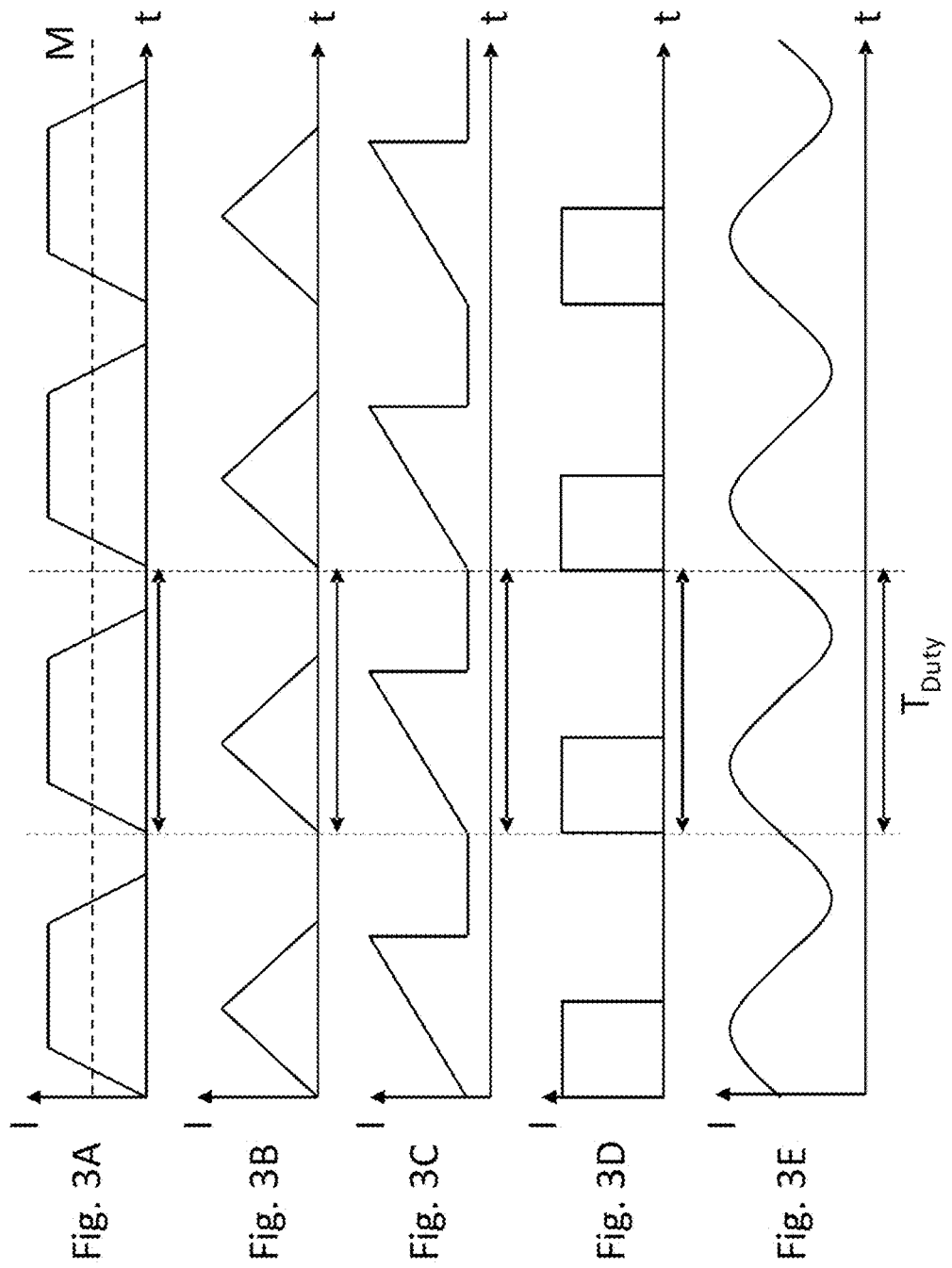

METHOD FOR JOINING AT LEAST TWO PARTS TO BE JOINED

CROSS REFERENCE TO RELATED APPLICATIONS

This application is a continuation of International Application No. PCT/EP2022/069983 (WO 2023/001730 A1), filed on Jul. 18, 2022, and claims benefit to German Patent Application No. DE 10 2021 118 593.9, filed on Jul. 19, 2021. The aforementioned applications are hereby incorporated by reference herein.

FIELD

Embodiments of the present invention relate to a method for joining at least two parts by using ultrashort laser pulses of a laser beam of an ultrashort pulse laser.

BACKGROUND

For joining together two parts to be joined, it is known to apply a laser beam to the respective parts to be joined in order in this way to produce by energy absorption in the zone impacted by the laser beam a melt which forms a welding seam between the parts to be joined after the solidification of the melt. The joining by means of ultrashort laser pulses allows a stable connection of the parts to be joined to be obtained in this case without the use of additional material.

It is at the same time known, for joining a transparent part to be joined to a non-transparent part to be joined or for welding two transparent parts to be joined, to place the focus or focus zone of the laser beam in the boundary surface or in an area around the common boundary surface of the two parts to be joined. In this case, the processing laser beam correspondingly passes through one of the transparent parts to be joined and produces a melt in the area of the boundary surface of the two parts to be joined.

If ultrashort laser pulses, i.e. laser pulses in the picosecond range or in the femtosecond range (e.g. 50 fs to 50 ps), are focused into the volume of a material, the high intensity in the focus can lead to nonlinear absorption processes. If the time interval of the successive ultrashort laser pulses is shorter than the heat diffusion time, then this leads to heat accumulation or a temperature increase in the material in the focus area. With each of the successive pulses, the temperature can then be increased to the melting temperature of the material and finally melt the material locally.

DE102018205325A1 discloses a method for laser welding with which continuous joining seams can be produced. However, the problem here is that the high temperature differences during joining can cause material stresses around the joining seam, which promote the formation of cracks.

DE102014203845A1 discloses a method for laser welding with which a spot welding of two parts to be joined can be performed. However, the problem here is that point-shaped joining zones can produce a significantly lower strength of the joining seam overall than with a continuous joining seam.

SUMMARY

Embodiments of the present invention provide a method for joining at least two parts by using ultrashort laser pulses of a laser beam of an ultrashort pulse laser. At least one of the two parts to be joined is transparent for a wavelength of the ultrashort laser pulses. The method includes joining the at least two parts by using the ultrashort laser pulses of the laser beam along a joining seam. The joining seam has at least two joining points and a joining gap lying between the at least two joining points. Each joining point is longer than 10 µm.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 1 shows a schematic structure for implementing the method according to some embodiments;
FIGS. 2A, 2B, and 2C show a schematic implementation of the method according to some embodiments;
FIGS. 3A, 3B, 3C, 3D, and 3E show a schematic representation of possible modulation functions according to some embodiments.

DETAILED DESCRIPTION

Figure 4A:
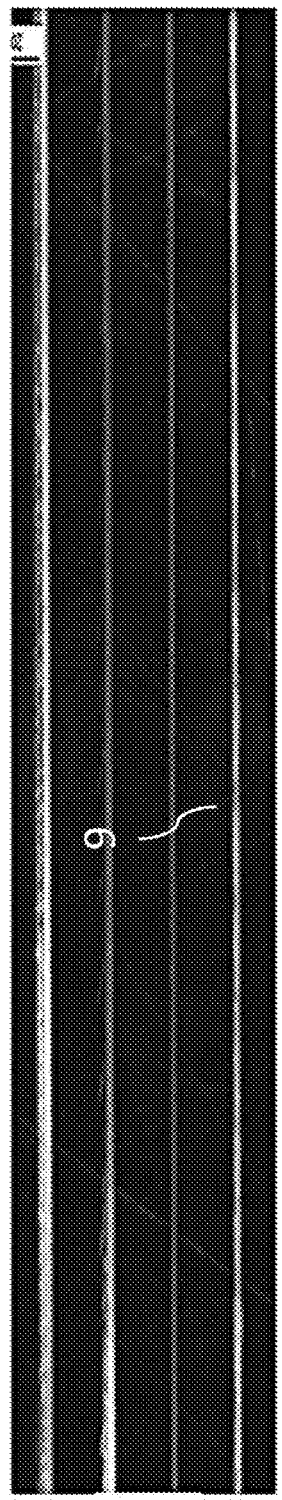
FIGS. 4A and 4B show micrographs of joining seams by a conventional method and by the method according to embodiments of the present invention.

Embodiments of the present invention provide an improved method for joining two parts to be joined.

Accordingly, a method for joining at least two parts to be joined by means of ultrashort laser pulses of a laser beam of an ultrashort pulse laser is provided, at least one of the parts to be joined being transparent for the laser wavelength used, the parts to be joined being joined together by means of ultrashort laser pulses of the laser beam along a joining seam. According to embodiments of the invention, the joining seam has at least two joining points and a joining gap lying in between, each joining point being longer than 10 µm, preferably longer than 50 µm.

The ultrashort pulse laser here provides the ultrashort laser pulses of the laser beam, the individual laser pulses forming the laser beam in the direction of beam propagation.

Instead of individual laser pulses, the laser may also provide bursts, with each burst comprising the emission of a number of laser pulses. For a certain time interval, the emission of the laser pulses may in this case follow one another very closely, at intervals of a few picoseconds to hundreds of nanoseconds. The bursts may be in particular so-called GHz bursts, in which the sequence of the successive laser pulses of the respective burst takes place in the GHz range.

In this context, a sequence of single pulses means that a number of single pulses are successively emitted by the laser. A sequence of single pulses therefore comprises at least two single pulses. A sequence of bursts means that a number of bursts are successively emitted by the laser. A sequence of bursts therefore comprises at least two bursts. In particular, the bursts or single pulses of the sequence may be the same in each case. The bursts or single pulses are the same if the laser pulses used have substantially the same properties, i.e. approximately the same pulse energy, the same pulse length and—in the case of bursts—also the same pulse intervals within the burst.

The transparency of the at least one part to be joined has the advantage that the joining laser can be focused through the transparent part to be joined, so that the joining area can be located at the boundary surface between both parts to be joined lying between the two parts to be joined—i.e. on the inner side.

For example, the first part to be joined may be transparent and the second part to be joined may be opaque for the wavelength of the laser. However, it is also possible for both parts to be joined to be transparent.

The first part to be joined may be transparent, preferably be a glass or a crystal or a ceramic or a plastic. The second part to be joined may be opaque, preferably be a metal or a semiconductor or a plastic or a ceramic.

For example, the first part to be joined may consist of or include quartz, aluminum silicate, borosilicate, sapphire, zirconium oxide. For example, the first part to be joined may consist of or include steel, aluminum or silicon. For example, the first part to be joined may be made of glass and the second part to be joined may be made of a metal, or both parts to be joined may be made of a plastic or different plastics. For example, the first part to be joined may consist of quartz glass and the second part to be joined may consist of aluminum.

The parts to be joined are arranged on top of one another so that the boundary surfaces of the parts to be joined, over which the parts to be joined are to be joined together, face one another. In the joining area, heat accumulation takes place by successive absorption of the ultrashort laser pulses, provided that the pulse rate of the laser beam is greater than the rate of heat dissipation by material-specific heat transporting mechanisms, in particular by heat diffusion. Due to the increasing temperature in the material of the at least first part to be joined from joining pulse to joining pulse or from burst to burst, the melting temperature of the material of the parts to be joined can finally be reached, which leads to a local melting of the material of the parts to be joined.

The area of the parts to be joined in which the ultrashort laser pulses are introduced and in which the material is melted is therefore understood as the joining area. Alternatively, the entirety of the locally melted material in the joining area may also be referred to as a melt bubble. Irrespective of how it is referred to, the melt that occurs can bridge the common boundary surface of the parts to be joined and permanently connect the parts to be joined together upon cooling. In particular, the network structure of the parts to be joined may in this case also change. The cooled melt, which connects the parts to be joined together or results in the joining connection, is then referred to as the joining point.

In order to melt the material in the joining area, single pulses and/or bursts can be introduced into the material and successively absorbed. This plurality of ultrashort single pulses and/or bursts introduced at a position is also called a laser spot, the number of ultrashort single pulses and/or bursts per laser spot N being given by the product of spot size SG and repetition rate P per feed rate VG: $N=SG*P/VG$. The spot size describes here the spatial area over which the ultrashort laser pulses and/or bursts are emitted into the material.

The size of the joining area is in this case additionally determined by the beam geometry, in particular the size of the focus zone of the focused laser beam. The beam geometry describes here the spatial configuration of the laser beam as well as other beam properties such as for example certain diffraction properties of the laser beam, see below.

According to embodiments of the invention, a joining seam has two joining points and a joining gap lying in between.

A joining gap is a point of the joining seam at which the parts to be joined are not joined together.

Since a joining gap is arranged between the two joining points, a crack initiated by material stress in the joining point cannot propagate along the entire joining seam, as for instance in the case of a continuous joining seam. In a sense, the joining gaps act as crack stoppers for cracks that propagate along the joining points. This allows a high resistance of the joining seam, for example to shock loads, to be achieved.

Such a joining seam makes it possible in particular also to join parts to be joined which have a local roughness or inhomogeneities, since at most individual joining points of the joining seam are impaired here by the roughness or inhomogeneities, but a high resistance and strength of the joining seam is achieved overall by the total number of remaining joining points.

According to embodiments of the invention, each joining point is longer than 10 μm, preferably longer than 50 μm. The length of the joining point is measured here parallel to the extent of the joining seam. The length of the joining point here mainly determines the strength of the joining point. For example, a joining point that is 10 times longer can have a strength that is 10 times greater. However, in principle, a longer joining point also has a greater risk of cracking, so that longer joining seams have a greater (theoretical) strength, but a lower resistance. For example, the ideal length of the joining points can be determined in a test in which the actual strength and resistance achieved is measured in dependence on the length of the joining point. In particular, a natural limit of the length of the joining seam is given by the longest dimension of the parts to be joined.

The length of the joining point therefore sets the strength of the joining point, while a high overall strength of the joining seam is achieved by the large number of joining points.

It is also possible that along the joining seam a joining point is always followed by a joining gap.

This has the advantage that closed joining seams can be produced. For example, a joining seam may be circular or rectangular. Here, there is always a joining gap arranged between two joining points. At the same time, joining points and joining gaps always alternate with one another along the circular or rectangular joining seam, so that at no point do for instance two joining points or joining gaps follow one another.

The resistance of the joining seam can be set by the length ratio of the joining points and the joining gaps along the joining seam.

The length ratio of the joining points and the joining gaps can be understood here as the ratio of adjacent joining points and joining gaps.

The length ratio of adjacent joining points and joining gaps may be between 10:90 and 95:5, preferably 70:30.

For example, a joining point may be 10 μm long and an adjacent joining gap 90 μm long. For example, a joining point may be 70 μm long and an adjacent joining gap 30 μm long. For example, a joining point may be 50 μm long and an adjacent joining gap 50 μm long.

It is therefore possible to set the theoretical strength of the joining points by the length of the joining points, while the overall strength of the joining seam is set by the total number of joining points along the joining seam. At the same time, the joining gaps can prevent the entire joining seam from being separated by a crack. Due to the length ratio, the resistance of the joining seam can therefore be adapted to the material stress or planned load.

The length ratio of joining points and joining gaps can be set by a duty cycle of the laser power, the laser power being modulated during the duty cycle according to a modulation function, preferably by a function generator.

A duty cycle may be understood as a recurring activation of the laser power, a duty cycle having at least one range of high laser power and one range of low laser power. In particular, a duty cycle may also include a modulation of the laser power, so that the laser power can become greater or smaller during the modulation. In particular, the length of ranges of high and low laser power are in a time ratio that can be selected as fixed for the duty cycle.

For example, the laser beam may have a high laser power in the first half of the duty cycle and have a vanishing laser power, or have no laser power, in the second half. For example, a joining point may be produced in the first half of the duty cycle and a joining gap in the second half.

A modulation function describes here the mathematically functional relationship between the variations over time of the laser power during a duty cycle. A modulation function may be for example a rectangle function. Here, a laser beam with full laser power is provided during the time of the rectangular pulse, while the laser power is attenuated or blocked outside the time of the rectangular pulse.

A modulation function may also be a triangle function or a sawtooth function. During the time of the triangle or sawtooth, the laser power is increased according to the respective function value of the modulation function until the tip of the triangle or sawtooth is reached. After that, the laser power of the laser beam may be attenuated again according to the modulation function.

A modulation function may also be a sine function. In particular, the modulation function may also have a so-called offset. For example, the modulation function may specify that the laser power of the laser beam is always modulated around a certain mean value (the offset).

The length ratio of joining points and joining gaps can be determined by the time ratio of the ranges of high laser power and low laser power.

For example, if the duration of the portion of the duty cycle with high laser power is 80% of the duty cycle and the duration of the portion with vanishing laser power is 20% of the duty cycle, then the length ratio of joining point to joining gap is 80:20.

The duty cycle may have a repetition rate of between 1 Hz and 1 kHz.

The repetition rate of the duty cycle indicates how often the laser power is modulated according to the modulation function of the duty cycle. By selecting the repetition rate of the duty cycle, the modulation of the laser power can be matched to the repetition rate of the ultrashort laser pulses and/or bursts. In addition, at a given feed rate, the length of the joining points and joining gaps can be determined by the repetition rate of the duty cycle.

If the duty cycle repeats at a rate of 10 Hz, the modulation function is a rectangle function, the rectangle—i.e. the time of the high laser power—is 50% of the duty cycle and the feed rate is 1 mm/s, then the laser beam covers a distance of 0.1 mm during a duty cycle, from which a joining point is produced in the first half, i.e. 50 µm, and no joining point, i.e. a joining gap, is produced in the second half.

The duty cycle may be produced here by a function generator. Here, a function generator is a control device which is suitable for activating the laser power according to a given modulation function.

For example, the modulation function may be output in the form of a voltage signal to a Pockels cell, which rotates the polarization of the laser beam in proportion to the voltage signal. A subsequent polarization filter or polarization analyzer can then conduct the respective polarization portions of the laser beam to the parts to be joined, whereby the laser power is modulated according to the modulation function.

However, the laser power may also be activated directly at a control input of the laser, so that the laser only outputs laser pulses with the intensity corresponding to the modulation function.

The average power of the laser spot may be between 0.1 W and 50 W.

The average power of the laser spot $L_S$ is defined for a single pulse as the product of pulse energy E, repetition rate $P_E$ of the single pulse and number of single pulses $N_E$: $L_{S,E}=E*P_E*N_E$. The average power of the laser spot at a burst is defined as the product of pulse energy E, number of pulses per burst $N_P$, number of bursts $N_E$ and the repetition rate at which the bursts are emitted $P_E$: $L_{S,P}=E*N_P*P_E*N_E$. The average power of the laser spot in the case of a burst is therefore only scaled with the number of laser pulses per burst compared to the average power in the case of the single pulse: $L_{S,P}=L_{S,E}*N_P$.

The laser pulses of a burst may have a time interval from one another in each case of at most 1 µs, preferably between 0.05 ns and 1000 ns, preferably between 20 ns and 80 ns, a burst comprising between 2 and 64 burst pulses, preferably between 2 and 16 burst pulses.

This has the advantage that suitable joining parameters can be found for many different materials, so that the strength of the joining connection can be set easily. In particular, the cooling phases of the parts to be joined, and the heat accumulation in the joining area, are controlled by the time intervals, so that high-quality and in particular stress- and crack-free joining seams and joining connections can be produced.

For example, the laser pulses of a laser burst may have a time interval of 50 ns, the laser burst comprising 10 burst pulses.

The repetition frequency of the single laser pulses and/or bursts may be between 0.5 kHz and 10 MHz, preferably between 1 kHz and 4 MHz.

For example, at a repetition frequency of 1 MHz, a burst can be emitted into the material every 1 µs. For example, a burst may comprise 25 laser pulses at intervals from one another of 20 ns. At a feed rate of 10 mm/s, a length of 10 nm is covered during the burst.

These 10 nm are typically significantly smaller than the beam diameter of the laser beam, so it can be assumed here that the pulses within the burst are all introduced to the same location in the material. At the same time, the 10 nm are also so small that it can be assumed that even successive bursts overlap at least partially.

For example, if the duty cycle has a repetition rate of 100 Hz, and the first 70% have a high laser power and the second 30% have a vanishing laser power, then a continuous joining point is produced in the first half of the duty cycle, while a joining gap is produced in the second half. Due to the feed rate of 10 mm/s, the length of the joining point is 70 µm, while the joining gap has a length of 30 µm.

By selecting and tuning the repetition frequencies, the rate of the process can be adapted well to the conditions of the process, such as for example the parts to be joined together. In particular, allowance can be made here for the expansion of the melt bubble, which, for example in the case of glass-glass connections, has expanded after about 1 ms, i.e. does not get any bigger.

The laser wavelength may be between 200 nm and 5000 nm, preferably at 1000 nm, and/or the pulse duration of the laser pulses may be between 10 fs and 50 ps, and/or the fluence in the focus zone may be greater than 0.01 J/cm$^2$ for an individual single pulse or a laser pulse of a burst.

These parameters allow the heat accumulation in the parts to be joined to be controlled, stresses to be reduced and more resistant joining seams to be created. In particular, it is therefore also possible to adapt the process parameters to the respective materials of the parts to be joined.

For example, the wavelength of the ultrashort laser pulse may be 1030 nm, the pulse duration of a single pulse being 400 fs and the fluence in the focus being for example 75 J/cm$^2$.

The laser beam and the parts to be joined may be moved and/or positioned relative to one another by a feed of between 0.01 mm/s and 1000 mm/s, preferably between 0.1 mm/s and 300 mm/s.

Moving relative to one another may mean moving either the laser beam or the parts to be joined, or both the laser beam and the parts to be joined. This can achieve the result that the laser beam introduces joining connections at different locations of the parts to be joined. In particular, this makes it possible to produce joining points and joining gaps alternately between the two parts to be joined.

The movement may in this case be brought about by a feed, it being possible for laser pulses or bursts to be introduced into the parts to be joined during the feed. Positioning of the parts to be joined relative to the laser beam consists in introducing the focus zone of the laser beam to the desired penetration depth and to the desired location. For example, the parts to be joined may be positioned on an axis system, so that the parts to be joined are moved relative to the laser beam. However, it is also possible to move the laser beam over the parts to be joined, for example the laser beam may be deflected by one or more acousto-optical deflectors or a galvano scanner.

The laser beam may be a quasi non-diffractive laser beam, preferably a Bessel beam or a Gaussian-Bessel beam, and the laser beam may preferably have a focus zone elongated in the direction of beam propagation.

In particular, non-diffractive beams and/or Bessel-like beams should be understood as beams for which a transverse intensity distribution is propagation-invariant. In particular, in the case of non-diffractive beams and/or Bessel-like beams, a transverse intensity distribution along the direction of beam propagation is substantially constant.

In addition, the focus zone of the processing laser beam is always understood as the part of the intensity distribution of the processing laser beam that is greater than the modification threshold of the material. The expression "focus zone" makes it clear here that this part of the intensity distribution is specifically provided and an intensity boost in the form of the intensity distribution is achieved by focusing.

With respect to the definition and properties of non-diffractive beams, reference is made to the book: "Structured Light Fields: Applications in Optical Trapping, Manipulation and Organisation", M. Wördemann, Springer Science & Business Media (2012), ISBN 978-3-642-29322-1. Reference is made to this expressly and in full.

Accordingly, non-diffractive laser beams have the advantage that they can have a focus zone which is elongated in the direction of beam propagation and is considerably larger than the transverse dimensions of the focus zone. In particular, a material modification elongated in the direction of beam propagation can be produced thereby, for example to allow firm joining of the parts to be joined.

In particular, non-diffractive beams make it possible to produce elliptical non-diffractive beams which have a non-radially symmetrical transverse focus zone. For example, elliptical quasi-non-diffractive beams have a principal maximum which coincides with the center of the beam. The center of the beam is given here by the location at which the principal axes of the ellipse intersect. In particular, elliptical quasi non-diffractive beams may emerge from the superposition of a plurality of intensity maxima, with in this case only the envelope of the intensity maxima involved being elliptical. In particular, it is not necessary for the individual intensity maxima to have an elliptical intensity profile.

For example, a non-diffractive beam can be generated from a flat wave field or from parallel partial laser beams if all the partial laser beams are refracted at the same angle β to the optical axis of the laser beam. As a result, near-axis partial laser beams already overlap on the optical axis shortly after the processing laser beam shaping optical unit, for example an axicon or a diffractive optical element, and therefore form an increased laser intensity, while off-axis beams only overlap later after the processing laser beam shaping optical unit and form an increased laser beam intensity. Therefore, a substantially constant laser intensity can be produced over a longitudinal length parallel to the direction of beam propagation.

Preferred exemplary embodiments are described below with reference to the figures. In this case, elements that are the same, similar or have the same effect are provided with identical reference signs in the different figures, and a repeated description of these elements is omitted in some instances, in order to avoid redundancies.

In FIG. 1, a structure 1 for implementing the method is shown schematically and a cross section of two parts to be joined 3, 8 together is shown very schematically. The parts to be joined 3, 8 are arranged here on top of one another at a common boundary surface 7.

An ultrashort pulse laser 4 provides ultrashort laser pulses of a laser beam 5. These can be introduced into the parts to be joined 3, 8 in the form of a sequence of single pulses or in the form of a sequence of bursts.

The average power of the laser spot may in this case be between 0.1 W and 50 W. The laser pulses of a burst may have a time interval from one another in each case of at most 1 µs, preferably between 0.05 ns and 1000 ns, preferably between 20 ns and 80 ns, a burst comprising between 2 and 64 burst pulses, preferably between 2 and 16 burst pulses. The repetition frequency of the single laser pulses and/or bursts may be between 0.5 kHz and 10 MHz, preferably between 1 kHz and 4 MHz. The laser wavelength may be between 200 nm and 5000 nm, preferably at 1000 nm, and/or the pulse duration of the laser pulses may be between 10 fs and 50 ps.

The laser beam 5 is focused by a suitable focusing optical unit 6 shown here very schematically in such a way that the focus zone F, i.e. the area of the intensity boost of the laser beam 5, coincides approximately with the common boundary surface 7 of the two parts to be joined 3, 8.

For example, the fluence in the focus zone F may be at least 0.01 J/cm$^2$. By focusing with the focusing optical unit 6, in particular the entry height of the focus zone F relative to the first surface of the part to be joined 8 in the direction of beam propagation can be determined here. In order to focus the laser beam 5 into the common boundary surface 7 of the parts to be joined 3, 8, the first part to be joined 8 in the direction of beam propagation needs to be transparent for the wavelength of the laser 4. For example, the first part to be joined 8 may be a glass or a crystal or a ceramic or a plastic. For example, the second part to be joined 3 may be opaque or transparent. For example, the second part to be joined 3 may be a metal or a semiconductor or a plastic or a ceramic.

At the boundary surface 7, successive laser pulses are absorbed in the focus zone F in such a way that the material of the parts to be joined 3, 8 melts and, beyond the boundary surface 7, bonds with the other part to be joined 8, 3, respectively. As soon as the melt cools, a permanent connection of the two parts to be joined 3, 8 occurs. In other words, the two parts to be joined 3, 8 are joined together in this area by welding. This area, in which the melting and bonding of the materials as well as the subsequent cooling of the melt takes place and in which the actual joining accordingly takes place, is also referred to as the joining point. The cooled melt and material bonding of the parts to be joined 3, 8 forms a welding seam.

The laser beam and the parts to be joined can be moved and/or positioned relative to one another by a feed VG of between 0.01 mm/s and 1000 mm/s, preferably between 0.1 mm/s and 300 mm/s. For this purpose, the parts to be joined may for example be positioned on a feeding device 10. This can achieve the result that the laser beam 5 is moved over the parts to be joined 3, 8 along a joining seam 9, so that the parts to be joined 3, 8 can be joined along the joining seam 9.

The joining seam 9 has at least two joining points 900 and a joining gap 902, which is arranged between the at least two joining points 900. According to embodiments of the invention, the joining points 900 are longer than 10 μm, preferably longer than 50 μm. Accordingly, a continuous joining seam 9 is not produced, but a joining seam 9 made up of joining points 900 and joining gaps 902. In particular, in the joining seam 9 in FIG. 1, a joining point 900 is always followed by a joining gap 902, so that a closed joining seam 9 can be produced easily.

The resistance and strength of the joining seam 9 can be set by the length ratio of joining points 900 and joining gaps 902 along the joining seam 9. Different length ratios of joining points 900 and joining gaps 902 are shown in FIGS. 2A to 2C. In FIG. 2A, the length ratio of joining point 900 to joining gap 902 is approximately 40:60. In FIG. 2B, the length ratio of joining point 900 to joining gap 902 is approximately 60:40. In FIG. 2C, the length ratio of joining point 900 to joining gap 902 is approximately 90:10. For example, the length ratio of joining point 900 and joining gap 902 along the joining seam 9 may however be between 10:90 and 95:5, preferably at 70:30.

The strength of the individual joining points 900 adds up along the joining seam 9 to an overall strength, longer joining points 900 theoretically having a higher strength than short joining points 900. Here, longer joining points 900, in particular continuously joined joining seams 9 (which consist only of a single joining point), are exposed to a greater risk of cracking, for example in the event of shock loads.

Therefore, the joining gaps 902 arranged between the joining points 900 acted as crack stoppers, which increase the resistance, for example to shock loads of the joining seam 9. The joining points 900 are locally restricted, so that the formation of a crack in the joining point 900 does not damage the entire joining seam 9. In particular, the formation of a crack in the joining point 900 can end at the start of the joining gap 902, since there is no joining point there that could crack. Since the other joining points 900 of the joining seam 9 are not damaged by the crack stopper 902, the overall strength of the joining seam 9 is largely retained and the resistance of the joining seam 9 increases.

For example, if the joining seam 9 is made up of one thousand joining points 900 and a single joining point 902 would break under a shock load, then nine hundred and ninety-nine joining points 902 would still be intact. The overall strength of the joining seam 9 would hardly be reduced as a result—at the same time, however, the resistance of the joining seam 9 is greater, since it is not completely destroyed under a shock load, but has largely remained unchanged.

FIG. 3 shows how the length ratio of joining point 900 to joining gap 902 can be set. For this purpose, the laser power of the laser beam 5 may be controlled, for example by a function generator. In order to produce a joining seam 9, here the modulation function with which the laser power is modulated over time may be periodically repeated. In particular, such a period is also called the duty cycle TDuty.

FIG. 3A shows a trapezoidal modulation function. The trapezoidal modulation function is distinguished by the fact that the laser power initially rises, remains at a constant laser power after the adjustable rise time, and then the laser power falls again. After that, the laser power is almost completely blocked for a further time period. This modulation cycle is repeated periodically, it being possible for the repetition rate of the duty cycle to be between 1 Hz and 1 kHz. As an example, a modification threshold M of the parts to be joined 3, 8 from which the laser power is high enough to initiate a joining process is also drawn in FIG. 3A. Accordingly, the parts to be joined are only joined if the laser power is above the modification threshold. The length ratio of joining point 900 and joining gap 902 therefore results from the time ratio of the modulation function at which the intensity of the laser is above or below the joining threshold of the parts to be joined 2, 8.

FIG. 3B shows a triangle function as a modulation function, FIG. 3C shows a sawtooth function as a modulation function, FIG. 3D shows a rectangle function as a modulation function and FIG. 3E shows a sine function as a modulation function.

In particular, the modulation functions in FIGS. 3C and 3D are shifted upward by an offset. Therefore, the parts to be joined 3, 8 may be effectively preheated with a non-vanishing laser power, or kept close to the modification threshold, so that, when the modification threshold is exceeded by the laser power, the material stresses introduced can be reduced by the lower thermal gradients.

In FIG. 4A, the plan view of the parts to be joined 3, 8 is shown and in it the first part to be joined 8 in the direction of beam propagation can be seen. By means of a feeding system (not shown), a continuous joining seam 9 which has the described disadvantages, such as for example a low resistance to shock loads, was produced here.

Figure 4B:
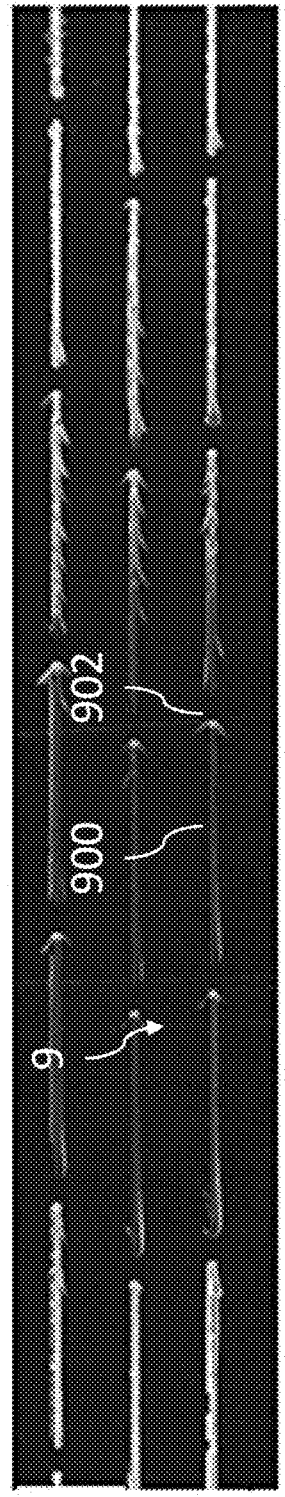

In FIG. 4B, a plan view of the parts to be joined 3, 8 is also shown, but here the joining seam 9 is made up of joining points 900 and joining gaps 902. For this purpose, the laser power was modulated by means of one of the modulation functions from FIG. 3. At the same time, the parts to be joined 3, 8 and the laser beam 5 were moved relative to one another at a feed rate VG, so that the modulation over time of the laser intensity could be translated into a spatial expression of the joining points 900 and joining gaps 902.

Figure 5A:
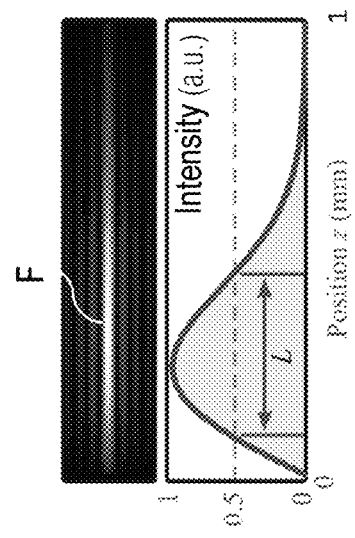
FIGS. 5A, 5B, 5C, and 5D show various possible laser beam profiles according to embodiments of the present invention.

FIG. 5A shows the variation in intensity and beam cross section of a quasi non-diffractive laser beam 5. In particular, the quasi non-diffractive beam 5 is a Bessel-Gaussian beam. The Bessel-Gaussian beam has a radial symmetry in the beam cross section in the x-y plane, so that the intensity of the laser beam depends only on the distance from the optical axis. In particular, the transverse beam diameter $d^{ND}_0$ is between 0.25 µm and 10 µm in size.

Figure 5C:
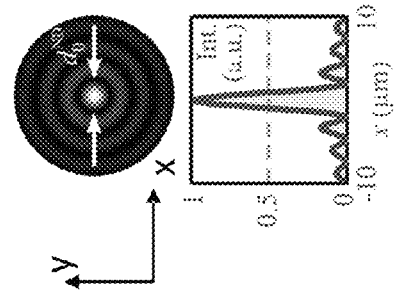
Figure 5B:
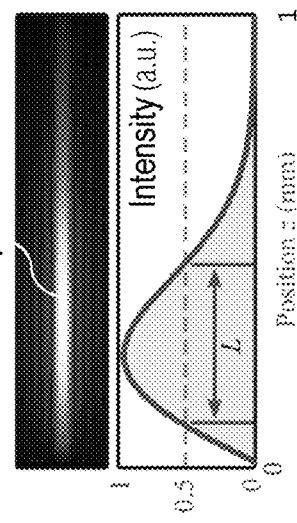

FIG. 5B shows the longitudinal beam cross section, i.e. the beam cross section in the direction of beam propagation. The beam cross section has an elongated focus zone, which is about 300 µm in size. Therefore, the focus zone F in the direction of propagation is significantly larger than the beam cross section in the x-y plane, so that there is an elongated focus zone.

FIG. 5C shows, analogously to FIG. 5A, a Bessel beam having a non-radially symmetrical beam cross section. In particular, the beam cross section appears stretched, almost elliptical, in the y-direction.

Figure 5D:
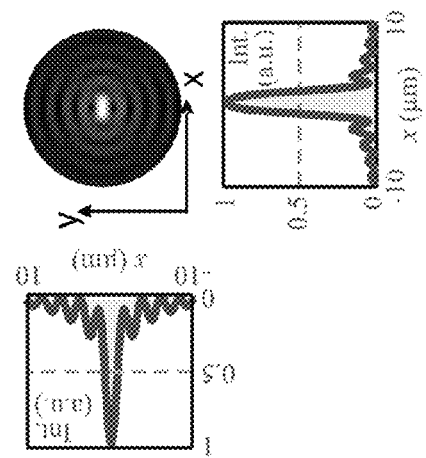

FIG. 5D shows the longitudinal focus zone of the Bessel beam, which again has a longitudinal extent of about 300 µm. Accordingly, the Bessel beam also has a focus zone elongated in the direction of beam propagation.

Insofar as applicable, all individual features presented in the exemplary embodiments can be combined with one another and/or interchanged, without departing from the scope of the invention.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Device
3 Part to be joined
4 Laser
5 Laser beam
6 Focusing optical unit
7 Boundary surface
8 Part to be joined
9 Joining connection
9 Joining seam
900 Joining point
902 Joining gap
F Focus zone
VG Feed rate
M Modification threshold

The invention claimed is:

1. A method for joining at least two parts by using ultrashort laser pulses of a laser beam of an ultrashort pulse laser, at least one of the two parts to be joined being transparent for a wavelength of the ultrashort laser pulses, the method comprising:
   directing and focusing the laser beam through the at least one transparent part of the two parts so as to form a focus zone at a common boundary surface between the at least two parts;
   modulating a laser power of the laser beam to produce a duty cycle, while the laser beam and the at least two parts to be joined are moved relative to each other by a feed speed in a direction perpendicular to a direction of the laser beam, so that the at least two parts are joined by the ultrashort laser pulses of the laser beam along a joining seam,
   wherein the joining seam is a closed joining seam and has a plurality of joining points and a plurality of joining gaps, and wherein the duty cycle is matched to a repetition frequency of the ultrashort laser pulses, wherein the duty cycle and the feed speed are selected so that each joining point is followed by a respective joining gap, and each joining point has a length in the direction of the feed speed that is longer than 10 µm.

2. The method as claimed in claim 1, wherein the length of each joining point is longer than 50 µm, and/or less than or equal to 70 µm.

3. The method as claimed in claim 1, wherein:
   a first part of the at least two parts, from which the laser beam is incident, is transparent for the wavelength of the ultrashort laser pulses,
   a second part of the at least two parts is opaque for the wavelength of the ultrashort laser pulses.

4. The method as claimed in claim 3, wherein the first part comprises one of a glass, a crystal, a ceramic, or a plastic.

5. The method as claimed in claim 3, wherein the second part comprises one of a metal, a semiconductor, a plastic, or a ceramic.

6. The method as claimed in claim 1, wherein a resistance of the joining seam is set by a ratio of the length of the joining point and a length of the joining gap along the joining seam.

7. The method as claimed in claim 6, wherein the ratio of the length of the joining point and the length of the joining gap along the joining seam is between 10:90 and 95:5.

8. The method as claimed in claim 7, wherein the ratio of the length of the joining point and the length of the joining gap is 70:30.

9. The method as claimed in claim 1, wherein the laser power is modulated according to a modulation function by a function generator.

10. The method as claimed in claim 9, wherein the modulation function is one of a rectangle function, a sawtooth function, a triangle function, or a sine function.

11. The method as claimed in claim 1, wherein the duty cycle has a repetition rate of between 1 Hz and 1 kHz.

12. The method as claimed in claim 1, wherein the joining seam is circular or rectangular.

13. The method as claimed in claim 1, wherein an average power of the laser beam is between 0.1 W and 50 W.

14. The method as claimed in claim 1, wherein the ultrashort laser pulses of a burst have a time interval between each other of at most 1 us, the burst comprising between 2 and 64 ultrashort laser pulses.

15. The method as claimed in claim 14, wherein the time interval is between 20 ns and 80 ns.

16. The method as claimed in claim 1, wherein the repetition frequency of the individual ultrashort laser pulses or of bursts of ultrashort laser pulses is between 0.5 kHz and 10 MHz.

17. The method as claimed in claim 1, wherein:
the wavelength of the ultrashort laser pulses is between 200 nm and 5000 nm, and/or a pulse duration of the ultrashort laser pulses is between 10 fs and 50 ps.

18. The method as claimed in claim 1, wherein the laser beam and the at least two parts to be joined are moved relative to each other by the feed speed of between 0.01 mm/s and 1000 mm/s, by at least one of an axis system, a galvanometer scanner, or an acousto-optical deflector.

19. The method as claimed in claim 1, wherein a fluence in the focus zone is greater than 0.01 J/cm$^2$ for an individual ultrashort laser pulse or a burst of ultrashort laser pulses.

20. The method as claimed in claim 1, wherein the laser beam is a Bessel beam or a Gaussian-Bessel beam, and the focus zone of the laser beam is elongated in a direction of beam propagation.

* * * * *